United States Patent
Erdol et al.

(10) Patent No.: US 6,310,963 B1
(45) Date of Patent: Oct. 30, 2001

(54) METHOD AND APPARATUS FOR DETECTING AN EAS (ELECTRONIC ARTICLE SURVEILLANCE) MARKER USING WAVELET TRANSFORM SIGNAL PROCESSING

(75) Inventors: Nurgun Erdol, Troy, NY (US); Feng Bao, Boca Raton, FL (US)

(73) Assignee: Sensormatic Electronics Corp, Deerfield Beach, FL (US)

( * ) Notice: Subject to any disclaimer, the term of this patent is extended or adjusted under 35 U.S.C. 154(b) by 0 days.

(21) Appl. No.: 08/315,942

(22) Filed: Sep. 30, 1994

(51) Int. Cl.⁷ .................................................. G06K 9/00
(52) U.S. Cl. .................. 382/103; 382/218; 382/278; 700/313; 700/400; 700/422
(58) Field of Search .................. 364/724.1, 725, 364/728.03; 382/103, 207, 208, 276, 218, 278; 340/572; 708/313, 314, 400, 422

(56) References Cited

U.S. PATENT DOCUMENTS

| | | | |
|---|---|---|---|
| H1005 | 12/1991 | Gerlach | 342/378 |
| 3,976,863 | 8/1976 | Engel | 235/152 |
| 4,125,866 | 11/1978 | Van Essen et al. | 364/724 |
| 4,660,025 * | 4/1987 | Humphrey | 340/572 |
| 4,686,516 | 8/1987 | Humphrey | 340/572 |
| 4,729,112 | 3/1988 | Millar | 364/724 |
| 4,760,543 | 7/1988 | Ligtenberg et al. | 364/725 |
| 4,791,390 | 12/1988 | Harris et al. | 333/166 |
| 4,797,807 | 1/1989 | Gerlach | 364/724.07 |
| 4,805,129 | 2/1989 | David | 364/724.01 |
| 4,807,173 | 2/1989 | Sommen et al. | 364/724.18 |
| 4,811,261 * | 3/1989 | Kobayashi et al. | 364/724.19 |
| 4,815,023 | 3/1989 | Arbeiter | 364/724.01 |
| 4,920,335 * | 4/1990 | Andrews | 340/572 |
| 5,140,332 * | 8/1992 | Martin et al. | 342/202 |
| 5,347,281 * | 9/1994 | Lewis et al. | 342/160 |
| 5,392,255 * | 2/1995 | LeBras et al. | 364/421 |
| 5,432,862 * | 7/1995 | Hirsch | 382/207 |
| 5,436,447 * | 7/1995 | Shew | 250/291 |
| 5,481,269 * | 1/1996 | Imhoff et al. | 342/90 |
| 5,486,833 * | 1/1996 | Barrett | 342/204 |

OTHER PUBLICATIONS

Soman et al., On Bit Allocation Strategies for Paraunity Subband Coders, 1991, p 741–745., IEEE.*

(List continued on next page.)

Primary Examiner—Timothy M. Jackson
(74) Attorney, Agent, or Firm—Robin, Blecker & Daley

(57) ABSTRACT

Wavelet transform processing is performed on an input signal received at a receiver circuit of an electronic article surveillance (EAS) system. The input signal includes a target signal generated by an EAS marker and also includes correlated high amplitude interference signals. The wavelet transform processing is performed so as to generate from the input signal plural wavelet transform signals having mutually different phases. The wavelet transform is substantially phase invariant with respect to the interference signals and lacks phase invariance with respect to the target signal. Uncorrelated components of the plural phase-diverse wavelet transform signals are identified to detect the target signal.

41 Claims, 10 Drawing Sheets

OTHER PUBLICATIONS

Carey, 'Wavelets' are Causing Ripples Everywhere, 2/92, p 74, Business Week.*

Wilburn, A Parallel Implementation of the Deiscrete Wavelet Transform, 5/94, p 260–264, IEEE.*

Narayan et al., Transform Domain LMS Algorithm, 6/83, p 609–615, IEEE, vol. ASSP-31, No. 3.*

Tuteur, Wavelet Transformations in signal Detection, 1988, pp. 1435–1438.*

Frisch et al., The Use of the Wavelet Transform in the Detection of an Unknown Transient Signal, 1992, pp. 892–897.*

Grossman et al., Reading and Understanding Continuous Wavelet Transforms, 1989, pp. 2–20.*

N. Erdol and F. Basbug, "Use of the Wavelet Transform for Signal Detection," Proceedings of SPIE 1993 International Symposium on Optical Engineering and Photonics in Aerospace and Remote Sensing, vol. 1961, pp. 401–410, Jul. 1993.

S. Mallat, "A Theory for Multiresolution Signal Decomposition: The Wavelet Representation," IEEE Transactions on Pattern Analysis and Machine Intelligence, vol. 11, No. 7, Jul. 1989, pp. 674–693.

I. Daubechies, "Orthonormal Bases of Compactly Supported Wavelets," Comm. Pure & Applied Math., vol. 41, 1988, pp. 909–996.

S. Mallat and Z. Zhang, "Matching Pursuits with Time–Frequency Dictionaries," Technical Report 619, Courant Institute of Mathematical Sciences, New York University, 1993.

R. Coifman, Y. Meyer and V. Wickerhauser, "Wavelet Analysis and Signal Processing," in *Wavelets and Their Applications*, M.B. Ruskai et al. editors, Jones and Bartlett Publishers, 1992, pp. 153–178.

N. Erdol and F. Bao, "Wavelet Transform Based Optimal Receivers," Proceedings of the 28th Asilomar Conference on Signals, Systems and Control, pp. 916–919 (published 1994).

F. Bao and N. Erdol, "On The Discrete Wavelet Transform and Shiftability," Proceedings of the 28th Asilomar Conference on Signals, Systems and Control, pp. 1442–1445 (published 1994).

M. Vetterli and C. Herley, "Wavelets and Filter Banks; Theory and Design," Columbia University, Center for Tele-–Communications Research, Technical Report, CU/CTR/TR 206/90/36 (published in IEEE Trans. on Signal Proc., 1992).

M. Smith and T. Barnwell, "Exact Reconstruction Techniques for Tree–Structured Subband Coders," IEEE Trans. Acoust. Speech and Signal Processing, vol. 34, pp. 434–441, 1986.

F. Bao and N. Erdol, "The Optimal Wavelet Transform and Translation Invariance," Proc. ICASSP, vol. III, pp. 13–16, 1994 (Mar.).

M. Frisch and H. Messers, "The Use of the Wavelet Transform in the Detection of an Unknown Transient Signal," IEEE Transactions on Information Theory, vol. 38, No. 2, Mar. 1992, pp. 892–897.

B. Friedlander and B. Porat, "Detection of Transient Signals by the Gabor Representation," IEEE Trans. Acoustics, Speech and Signal Processing, vol. 37, No. 2, Feb. 1989, pp. 169–180.

F. Tuteur, "Wavelet Transformations in Signal Detection," Proceedings of the ICASSP-88, pp. 1435–1438 (1988).

M. Vetterli and C. Herley, "Wavelets and Filter Banks: Relationships and New Results," Proc. 1990 IEEE Int. Conf. Acoust., Speech, Signal Processing, Albuquerque, N.M., pp. 1723–1726, Apr. 3–6, 1990.

O. Rioul and M. Vetterli, "Wavelets and Signal Processing," IEEE SP Magazine, Oct. 1991, pp. 14–38.

M. Erdol and F. Basbug, "Wavelet Transform Based Adaptive Filtering," Signal Processing VI: Theories and Applications, I. Vandewalle, R. Boite, M. Mooney, A. Osterlinck, eds., 1992, pp. 1117–1120.

G. Strang, "Wavelets and Dilation Equations: A Brief Intoduction," SIAM Review, vol. 31, No. 4, pp. 614–627, Dec. 1989.

H. Resnikoff and C. Burrus, "Relationships Between the Fourier Transform and the Wavelt Transform," SPIE Proceedings—Advanced Signal–Processing Algorithms, Architectures, and Implementations, vol. 1348, pp. 291–300, Jul. 10–12, 1990.

"Wavelets Are Causing Ripples Everywhere," *Business Week*, Feb. 3, 1992, p. 74.

M. Bassevile, "Detection of Abrupt Changes in Signal Processing," in *Wavelets, Time–Frequency Methods and Phase Space*, Proc. Int. Conf., Marseille, France, Dec. 14–18, 1987, J.M. Combes et al. eds., Inverse Problems and Theoretical Imaging, Springer, 1989, pp. 99–101.

Y. Meyer, "Orthonormal Wavelets," Proc. Int. Conf., Marseille, France, Dec. 14–18, 1987, J.M. Combes, et al., eds., Inverse Problems and Theoretical Imaging, Springer, pp. 21–37.

A. Grossman, R. Kronland—Martinet and J. Morlet, "Reading and Understanding Continuous Wavelet Transforms," Proc. Int. Conf., Marseille, France, Dec. 14–18, 1987, J.M. Combes et al. eds., Inverse Problems and Theoretical Imaging, Springer, 1989, pp. 2–20.

P. Flandrin, "Some Aspects of Non–Stationary Signal Processing with Emphasis on Time–Frequency and Time–Scale Methods," Proc. Int. Conf., Marseille, France, Dec. 14–18, 1987, J.M. Combes et al. eds., Inverse Problems and Theoretical Imaging, Springer, 1989, pp. 68–98.

* cited by examiner

METHOD AND APPARATUS FOR DETECTING AN EAS (ELECTRONIC ARTICLE SURVEILLANCE) MARKER USING WAVELET TRANSFORM SIGNAL PROCESSING

FIELD OF THE INVENTION

This invention is related to signal processing and more particularly is concerned with detection of an electronic article surveillance marker using wavelet transform processing.

BACKGROUND OF THE INVENTION

It has long been known to perform signal analysis using a sinusoidal analyzing signal. Well-known techniques of this type include Fourier analysis and the discrete cosine transform. Typical applications of these techniques include spectral analysis and data compression.

Signal analysis using a sinusoidal analyzing signal is well-suited for analysis of so-called "stationary" signals, i.e., signals whose characteristics remain unchanged over relatively long periods of time. However, there are difficulties in attempting to analyze signals exhibiting non-stationary characteristics on the basis of sinusoidal signals. In attempting to overcome these difficulties, it has been proposed to perform the signal analysis over limited time "windows" or, similarly, to use an analyzing signal constructed by multiplying a sinusoidal function with a windowing function. Such "windowed" analyzing functions have been applied with some degree of success to analysis of signals exhibiting short-term behavior but there has remained a need to improve the unavoidable trade-off of frequency resolution against time resolution.

Another type of signal analysis known as the wavelet transform has recently been proposed.

The basis functions used in the wavelet transform are obtained from a single prototype or basis wavelet ("mother wavelet") h(t) by applying a scaling factor and a translation factor to provide a "family" of wavelets:

$$h_{a,b}(t) = \frac{1}{(\sqrt{a})} h\left(\frac{t-b}{a}\right)$$

The scaling factor a stretches or shrinks (dilates or compresses) the basis wavelet, while the translation factor b shifts the basis wavelet in time. For discrete analysis it has been found convenient to limit the scaling factor a to powers of two, i.e., $a=2^m$, (m being an integer) and to limit the translation factor b to integers n, it being understood that m and n may be negative or zero as well as positive. It has also been proposed to perform a wavelet transform on a discrete sequence of signals by a filter bank algorithm as schematically illustrated in FIG. 1.

In FIG. 1 a signal sequence x(n) is input into a multi-stage filter bank formed of a cascaded halfband lowpass blocks LP1, LP2, LP3, etc.; halfband highpass blocks HP1, HP2, HP3, etc.; and decimation blocks D1, D2, D3, D4, D5, D6, etc. Each of the halfband lowpass blocks is identical and is implemented using a scaling function $\phi(x)$. The cascaded lowpass blocks provide a multiresolution analysis of the input signal, and each halfband highpass block is identical, except for time reversal, to the standard lowpass blocks LP1, LP2 etc. so that each signal band can be perfectly reconstructed from the outputs of the respective lowpass and highpass blocks for the band. The decimation blocks carry out decimation by a factor of two; that is, every other sample is discarded. The desired wavelet transform coefficients in the respective signal bands (octaves) are provided as the output signals from the decimation blocks D1, D3, D5, etc. Wavelet filter banks have been described, for example, in "Wavelets and Filter Banks: Theory and Design," M. Vetterli and C. Herley, IEEE Transactions on Signal Processing, 1992; "A Theory for Multiresolution Signal Decomposition: The Wavelet Representation," S. Mallat, IEEE Transactions on Pattern Analysis and Machine Intelligence, vol. 11, no. 7, July 1989, pp. 674–693; "Wavelets and Filter Banks: Relationships and New Results," M. Vetterli and C. Herley, Proceedings, 1990 IEEE International Conference on Acoustics, Speech and Signal Processing, April 1990, pp. 1723–1726; "Wavelets and Signal Processing," O. Rioul and M. Vetterli; IEEE SP Magazine, October 1991, pp. 14–38.

It has been proposed to employ wavelet transform analysis in data compression, image analysis, computer vision, speech recognition and seismic signal analysis, among other applications. It has also been suggested that wavelet transform analysis could be applied to detection of transient signals. ("Use of the Wavelet Transform for Signal Detection," N. Erdöl and Filiz Basbug̃, Proceedings of SPIE 1993 International Symposium on Optical Engineering and Photonics in Aerospace and Remote Sensing, April 1993, vol. 1961, pp. 401–410; "Detection of Transient Signals by the Gabor Representation," B. Friedlander and B. Porat, IEEE Trans. Acoust., Speech, Signal Proc., vol. 38, 1992, pp. 169–180; "Wavelet Transformations in Signal Detection," F. B. Tuteur, Proceedings of ICASSP-88, 1988, pp. 1435–38 (detection of abnormalities in electrocardiograms)). However, prior approaches to wavelet-based transient detection have not dealt satisfactorily with the sensitivity of the wavelet transform to the phase of the input signal. Because wavelet transform analyses suitable for detecting the transient signals generally lack phase-invariance, shifts in the initial phase of the target signal result in significant "leakage" in wavelet transform coefficients between translations. Where the time of occurrence of the target signal is not known in advance, the leakage between translations can prevent signal detection. It has been proposed to perform transient signal detection by matching against a translation—invariant template wavelet coefficients that differ substantially from zero ("The Use of the Wavelet Transform in the Detection of an Unknown Transient Signal," M. Frisch and N. Messer, IEEE Transactions on Information Theory, vol. 38, No. 2, March 1992, pp. 892–897) but, such an approach has not been found to perform very successfully, and also entails computational complexity.

It also has not heretofore been recognized that wavelet transform analysis can be applied to electronic article surveillance (EAS) systems, and particularly to detection of a signal generated by an EAS marker in response to an interrogation signal field formed by an EAS system. Typically, the EAS marker signal is received along with correlated noise signals of higher amplitude than the marker signal. Also, the amplitude and the time of occurrence of the marker signal are not known in advance. Reliable detection of the marker signal consequently presents significant challenges.

OBJECTS AND SUMMARY OF THE INVENTION

It is accordingly an object of the present invention to detect a transient signal of unknown initial phase by using wavelet transform analysis.

It is a further object of the invention to provide an improved electronic article surveillance system.

According to an aspect of the invention, there is provided a method of generating wavelet transform signals having mutually different phases, including the steps of receiving an input digital signal having a sampling frequency fs, performing a wavelet transform with respect to the received input digital signal to obtain a wavelet transform signal in a signal band of the input signal, subsampling the wavelet transform signal in the signal band by a factor of two to obtain a first wavelet transform signal having a first phase, and delaying the wavelet transform signal in the signal band by a sampling period corresponding to the sampling frequency fs and subsampling the delayed signal by a factor of two to obtain a second phase wavelet transform signal having a second phase that is different from the first phase.

Accordingly to another aspect of the invention, there is provided a method of performing signal analyses on an input signal which includes a transient target signal that is predictable as to shape but not as to amplitude or time of occurrence and interference signals correlated with the target signal, including the steps of performing a wavelet transform on the input signal so as to generate plural wavelet transform signals which have mutually different phases, with the wavelet transform being substantially phase-invariant with respect to the interference signals and substantially lacking in phase-invariance with respect to the target signal and detecting the target signal by amplifying and detecting uncorrelated components of the plural wavelet transform signals.

According to another aspect of the invention, there is provided an electronic article surveillance system including circuitry for generating and radiating an interrogation signal, circuitry for receiving an analog signal that includes a target signal formed by an electronic article surveillance marker upon exposure to the radiated interrogated signal and interference signals correlated with the target signal, an analog filter for filtering the received analog signal, an analog-to-digital converter for converting the filtered analog signal into a digital signal, and an integrated circuit signal processing device for receiving the digital signal, where the integrated circuit signal processing device is programmed to perform a wavelet transform on the received digital signal.

According to another aspect of this invention, the integrated circuit signal processing device is programmed to:

perform the wavelet transform so as to obtain a first intermediate wavelet transform signal in a signal band of the received digital signal;

subsample the first intermediate wavelet transform signal in the signal band by a factor of two to obtain a second intermediate transform signal:

delay the first intermediate wavelet transform signal in the signal band by a sampling period which corresponds to a sampling frequency fs of the digital signal;

subsample the delayed first intermediate wavelet transform signal by a factor of two to obtain a third intermediate wavelet transform signal;

perform a second wavelet transform with respect to the second intermediate transform signal to obtain a fourth intermediate transform signal in a subband of the signal band;

subsample the fourth intermediate wavelet transform signal by a factor of two to obtain a first final wavelet transform signal having a first phase;

delay the fourth intermediate wavelet transform signal by the sampling period;

subsample the delayed fourth intermediate wavelet transform signal by a factor of two to obtain a second final wavelet transform signal having a second phase that is different from the first phase;

perform the second wavelet transform with respect to the third intermediate wavelet transform signal to obtain a fifth intermediate wavelet transform signal in the subband of the signal band;

subsample the fifth intermediate wavelet transform signal by a factor of two to obtain a third final wavelet transform signal having a third phase that is different from the first and second phases;

delay the fifth intermediate wavelet transform signal by the sampling period; and subsample the delayed fifth intermediate wavelet transform signal by a factor of two to obtain a fourth final wavelet transform signal having a fourth phase that is different from the first, second and third phases.

According to a further aspect of the invention, the integrated circuit signal processing device is programmed to perform respective digital filtering on the first through fourth final wavelet transform signals, perform a respective energy accumulation with respect to each of the digitally filtered first through fourth final wavelet transform signals to form first through fourth energy accumulation signals, apply a threshold function respectively to each of the first through fourth energy accumulation signals to produce first through fourth comparison signals, quantify a degree uncorrelation among the first through fourth comparison signals to generate a discrimination signal, and compare the discrimination signal to a predetermined detection level; the system according to this aspect of the invention also includes an indication device responsive to the integrated signal processing device for indicating detection of the electronic article surveillance marker, when the discrimination signal exceeds the predetermined detection level.

According to further aspects of the invention, the wavelet transforms are performed with an analyzing wavelet selected to match the target signal and the digital filtering of the first through fourth final wavelet transform signals is performed with a filtering algorithm matched to the analyzing wavelet.

By generating the plural wavelet transform signals of diverse phases in accordance with the invention and then detecting lack of correlation among the plural wavelet transform signals, the lack of phase invariance of the wavelet transform with respect to the target signal, rather than presenting an obstacle to detection, is in fact utilized to perform signal detection.

The foregoing and other objects and features of the invention will be further understood from the following detailed description of preferred embodiments and practices thereof and from the drawings, wherein like reference numerals identify like components and parts throughout.

DESCRIPTION OF PREFERRED EMBODIMENTS AND PRACTICES

Figure 2:
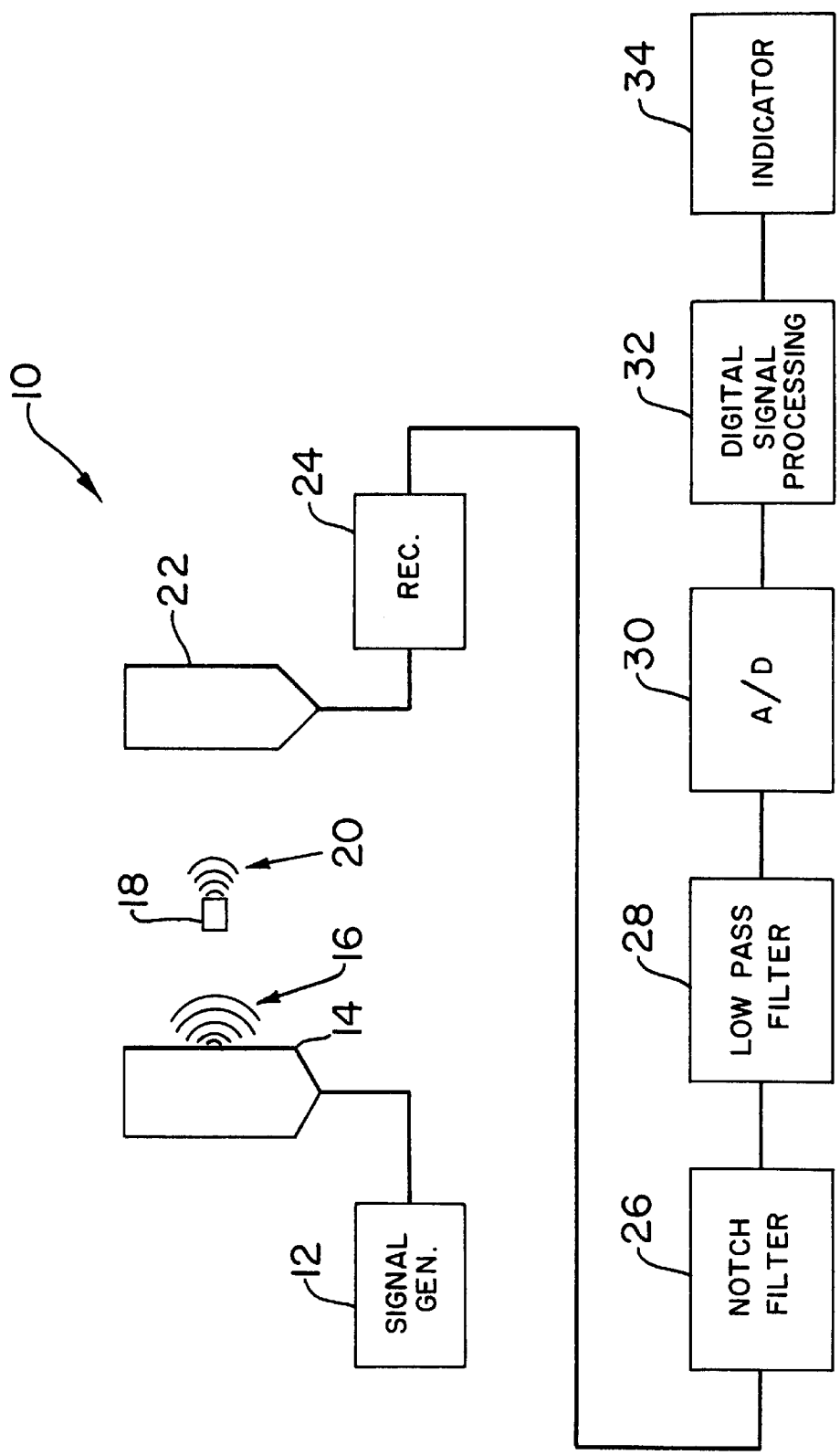
FIG. 2 is a schematic block diagram of an electronic article surveillance system in which wavelet transform processing is employed in accordance with the present invention.

FIG. 2 illustrates in schematic block diagram form an electronic article surveillance system 10 in which the present invention is embodied.

EAS system 10 includes a signal generating circuit 12 which drives a transmitting antenna 14 to radiate an interrogation field signal 16. An EAS marker 18 is exposed to the interrogation field signal 16 and in response thereto radiates a target signal 20. The target signal 20 is received at a receiving antenna 22 along with interference signals from various sources, and a combined signal including the interference signals and the target signal is provided from the receiving antenna 22 to a receiver circuit 24.

The elements 12, 14, 18, 22 and 24 may, for example, comprise EAS equipment of the type in which the interrogation field signal 16 alternates at a predetermined frequency and the marker 18 radiates a target signal 20 that is a pulse rich in harmonics of the frequency of the alternating field 16. A system of this type is described, for example, in U.S. Pat. No. 4,686,516 issued to Humphrey and systems of this type are manufactured and sold under the trademark "AISLEKEEPER" by Sensormatic Electronics Corporation, Deerfield Beach, Fla., the assignee of this application.

As noted above, signals received at the receiving antenna 22 include interference signals in addition to the target signal 20. The amplitude of the interference signals is frequently greater than the amplitude of the target signal 20 and are often correlated with the target signal 20. It is customary to use EAS systems in retail stores, an environment which is rich in sources of interference signals. Among the sources are the usual 60 Hz radiation from the building power circuitry, signals radiated from common retail store equipment such as bar code scanning equipment, cash registers and automatic door openers; noise signals radiated from power supplies for various kinds of electronic equipment, and also reflections of the EAS interrogation field signal from items such as shopping carts, credit cards, keys, and so forth. In addition, it is quite often the case that two or more pairs of EAS antennas are installed in proximity to each other, in which case shielding is provided between the pairs of antennas and strong noise signals ("shield spikes") are provided by reflections of the EAS interrogation field signals from the shields.

The input signal received at receiver circuit 24 is subjected to conditioning in analog form at a notch filter 26 and a lowpass filter 28 before conversion into a digital signal at an analog-to-digital converter 30. The notch filter 26 is arranged to reject noise signals at the frequency of the interrogation field signal 16. In the above-mentioned AISLEKEEPER system, the interrogation signal is at 73 Hz, and for application of the invention to such a system the notch filter would accordingly be arranged to trap signals at this frequency. Then the lowpass filter 28 has a cutoff frequency of about 4 KHz so that high frequency noise is filtered out. Although not shown in FIG. 2, a highpass filter with a cutoff frequency of about 40 Hz may also be provided upstream from the A/D converter 30 to filter out low frequency noise.

The A/D converter 30 may be of a conventional type. According to preferred embodiments of the invention the A/D converter provides 8 bit samples at a sampling frequency fs of 24 or 48 KHz.

The input signal, after analog filtering and conversion to a digital signal as indicated above, is provided to a digital signal processing circuit 32. The DSP circuit 32 may be realized, for example, by conventional DSP integrated circuits such as the model TMS-320C26 or the model TMS320C30, both of which are available from Texas Instruments.

Figure 4:
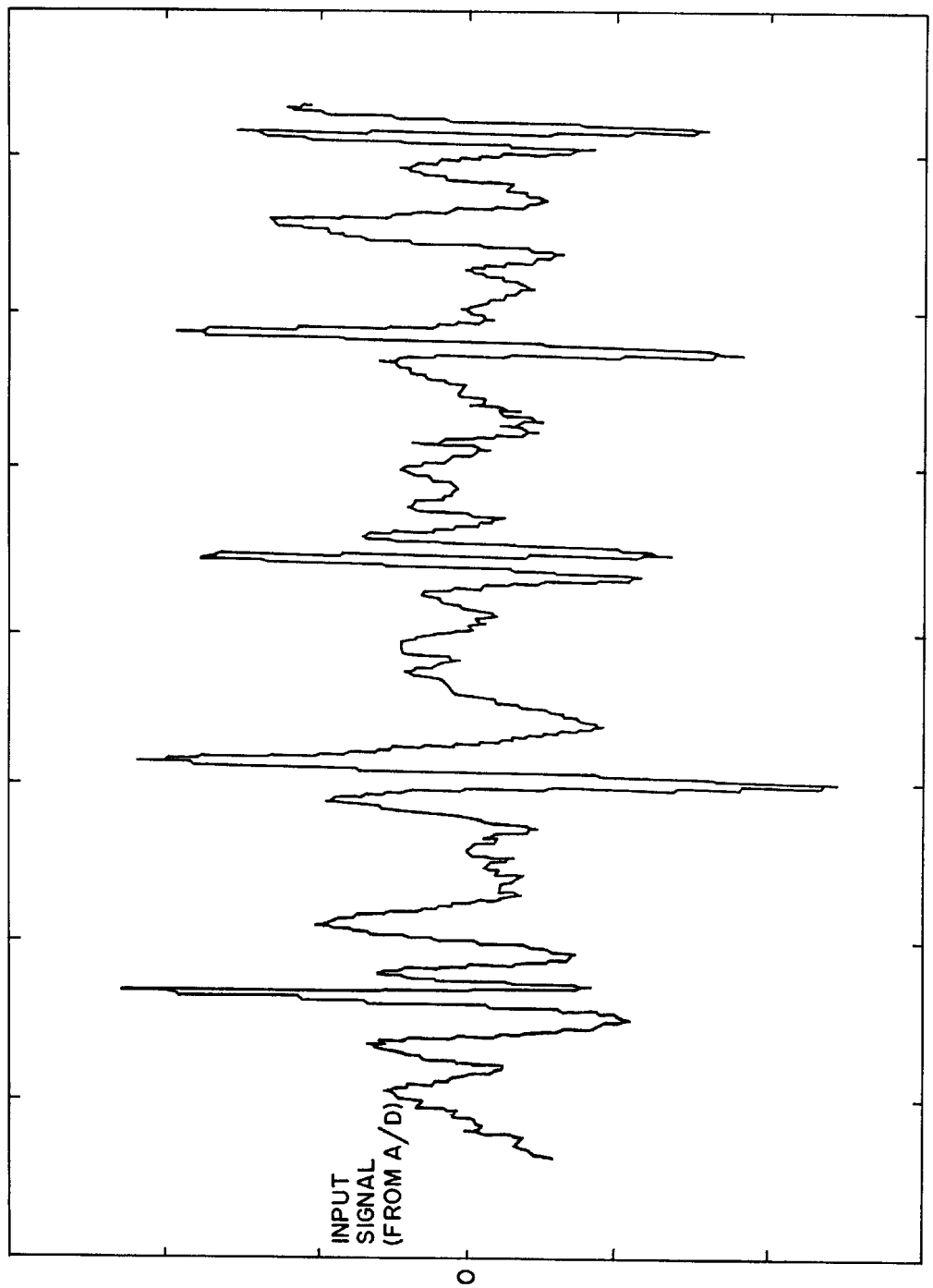
FIG. 4 is a waveform diagram of a typical input signal provided for processing to the digital signal processing circuit.

A typical example of the input signal provided to DSP 32 is shown in FIG. 4, which includes, in addition to the target signal to be detected, relatively high amplitude interference including shield spikes. The function of the DSP 32 is to detect the target signal within the input signal and to actuate an indicator 34 which provides an audible and/or visible indication that a marker 18 has been detected in the interrogation field.

Figures 3, 3A:
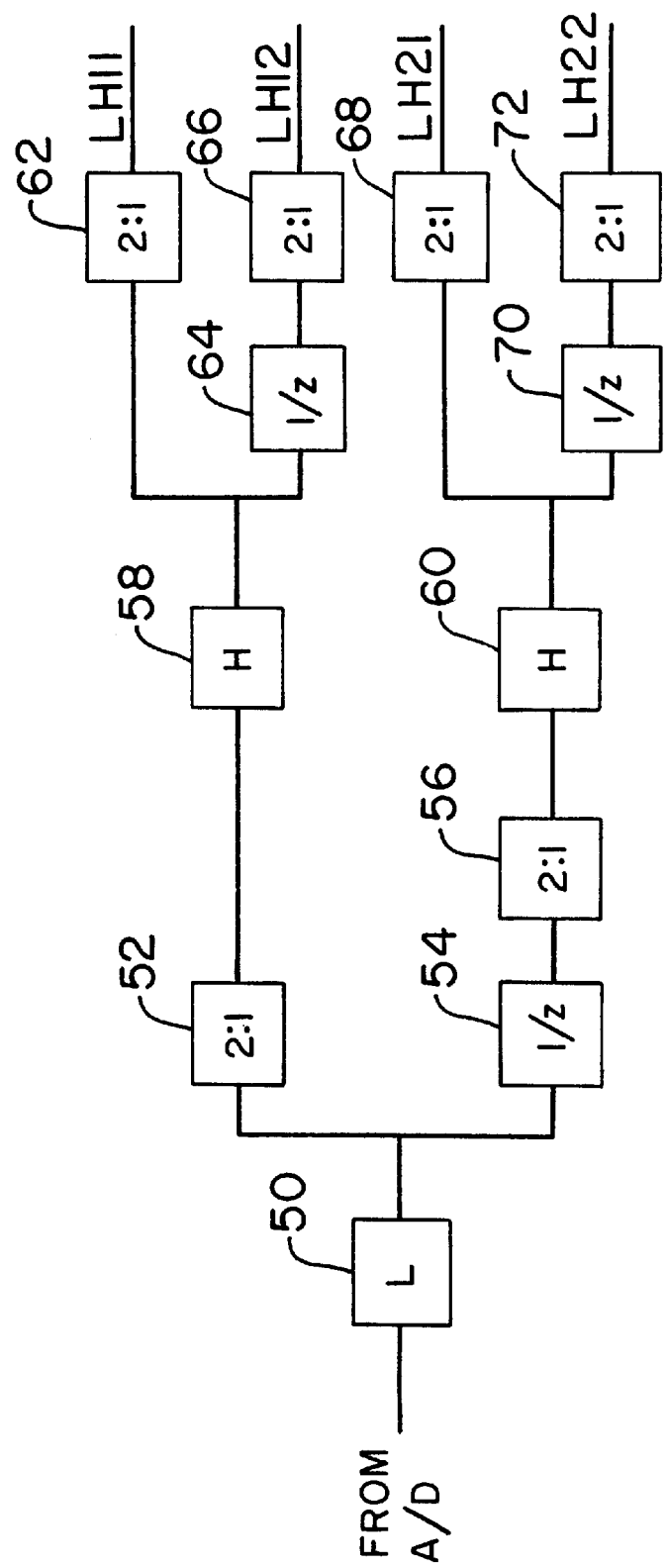
FIGS. 3A and 3B together form a block-schematic illustration of a signal processing algorithm carried out in a digital signal processing circuit that forms part of the EAS system of FIG. 2.
Figure 3B:
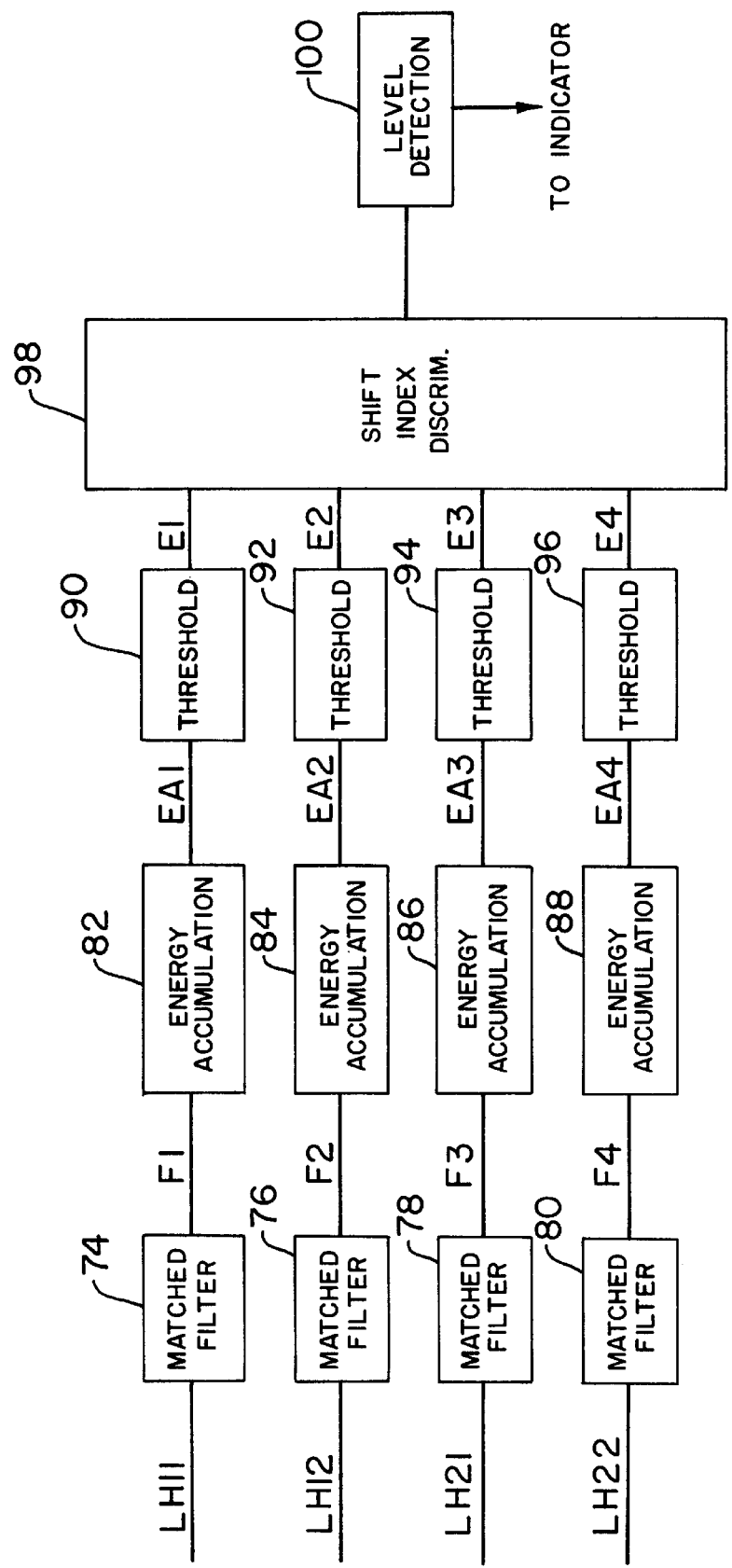

FIGS. 3A and 3B together schematically illustrate in block form signal processing carried out in DSP 32 in order to detect the presence of the target signal. In particular, FIG. 3A illustrates wavelet transform processing with offset subsampling carried out in accordance with the invention on the input signal to generate from the input signal plural wavelet transform signals having mutually different phases. FIG. 3B, in turn, illustrates the performance of digital filtering and signal conditioning performed on the plural wavelet transform signals and detection of uncorrelated components in the plural wavelet transform signals. The presence of the uncorrelated components are indicative of the presence of the target signal.

The wavelet transform processing of FIG. 3A will now be described in detail.

Figure 1:
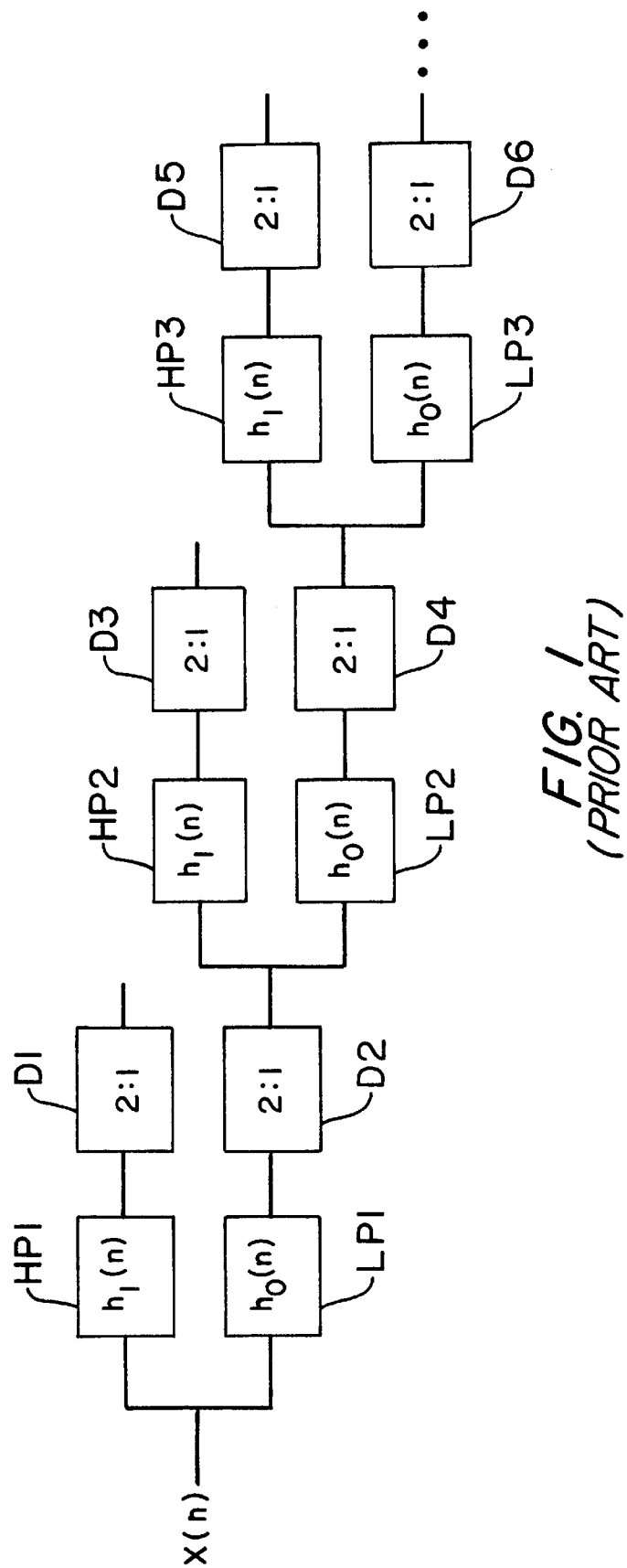
FIG. 1 is a schematic representation of a wavelet transform implemented in accordance with the prior art as a cascaded filter bank.

The processing illustrated in FIG. 3A constitutes wavelet transform processing implemented in the form of a two-stage filter bank. The filter bank shown in FIG. 3A is analogous to the prior art filter bank of FIG. 1 except that the filter bank of FIG. 3A includes offset subsampling at each stage to produce four output signals (LH11, LH12, LH21, and LH22) having four mutually different phases. In particular, a lowpass wavelet transform stage 50 produces a first intermediate wavelet transform signal which is provided to a subsampling block 52, at which subsampling by a factor of two is performed to generate a second intermediate wavelet transform signal.

The first intermediate wavelet transform signal is also supplied to a delay block 54 which delays the first intermediate transform signal by one sampling period corresponding to the sampling frequency fs of the A/D converter, and the delayed signal is then provided to another subsampling block 56 which performs subsampling by a factor two thereon to produce a third intermediate wavelet transform signal. The second and third intermediate wavelet transform signals are respectively provided to identical highpass blocks 58 and 60 at which further wavelet transform processing is performed to generate fourth and fifth intermediate transform signals from the second and third intermediate signals, respectively.

The fourth intermediate wavelet transform signal produced at the highpass block 58 is subjected to subsampling by a factor of two at a subsampling block 62 to produce a first final wavelet transform signal LH11. The fourth intermediate wavelet transform signal is also subjected to a one sampling period delay at a delay block 64 and then is subsampled by a factor of two at a subsampling block 66 to produce a second final wavelet transform signal LH12.

Similarly, the fifth intermediate wavelet transform signal produced at highpass block 60 is subjected to subsampling by a factor of two at subsampling block 68 to produce a third final wavelet transform signal LH21, and the fifth intermediate wavelet transform signal is also delayed by one sampling period at a delay block 70 and then the delayed signal is subsampled by a factor of two at a subsampling block 72 to produce a fourth final wavelet transform signal LH22.

It will be recognized that the signal LH12 is 90° out of phase with the signal LH11, while the signal LH21 is 90° out of the phase with signal LH12 and 180° out of phase with signal LH11. Further, the signal LH22 is 90° out of phase with signal LH21, 180° out of phase with signal LH12, and 270° out of phase with signal LH11.

The wavelet transform implemented by the blocks 50, 58 and 60 is selected so as to substantially lack shift invariance with respect to the target signal, while exhibiting substantial shift invariance with respect to the interfering signals. In particular, the basis wavelet for the wavelet transform is selected to match the target signal. For this purpose, construction of the wavelet in the frequency domain was found to be helpful. Construction of the wavelet is described below.

As is well known, a multiresolution analysis can be defined as a set of embedded subspaces $V_i$ of $L^2(R)$ such that:

$$\ldots V_2 \subset V_1 \subset V_0 \subset V_{-1} \subset V_{-2} \ldots \quad (1.\text{i})$$

$$\bigcap_{j=-\infty}^{\infty} V_j = \{0\}; \quad \bigcup_{j=-\infty}^{\infty} V_j = \{L^2(R)\} \quad (1.\text{ii})$$

$$f(t) \in V_j \text{ if and only if } f(2t) \in V_{j-1} \quad (1.\text{iii})$$

and there exists $\phi_0(t)$ such that:

$$\phi(t-n) \text{ span } V_0 \quad (1.\text{iv})$$

and $$\int \phi_0(t) \phi_0(t-n) dt = \delta(n) \quad (1.\text{v})$$

As a result, the time-scaling function $\phi(t)$ satisfies the dilation equation:

$$(\tfrac{1}{2})\phi(+t/2) = \Sigma_k h(k)\phi t - k \quad (2.1)$$

$$\hat{\phi}(2f) = H(f)\hat{\phi}(f) \quad (2.\text{ii})$$

where ^ denotes the Fourier integral of a continuous time function, and H(f) denotes the 1-periodic Fourier transform of the sequence h(k).

The continuous time-scaling function $\phi(t)$ can be reconstructed from the discrete-time sequence h(k), and in particular $$\hat{\phi}(f) = \prod_{j=1}^{\infty} H(f/2^j)$$

if the following conditions are satisfied:

$$h(k) < c(1+k^2)^1 \text{ for some } c > 0 \quad (3.\text{i})$$

$$|H(0)| = 1 \quad (3.\text{ii})$$

$$|H(f)|^2 + |H(f+\tfrac{1}{2})|^2 = 1 \quad (3.\text{iii})$$

$$|H(f)| \geq \sqrt{2}/2 \text{ for } |f| < \tfrac{1}{4} \quad (3.\text{iv})$$

A family of discrete-time filters $H^i(f)$ can be constructed from a known H(f) using the following operation:

$$H^1(f) = H(\tfrac{1}{2} - (\tfrac{1}{2})|H(f)|^2) \quad (4.\text{i})$$

$$H^i(f) = H^{i-1}(\tfrac{1}{2} - (\tfrac{1}{2})|H^{i-1}(f)|^2) \quad (4.\text{ii})$$

$$H^0(f) = H(f) \quad (4.\text{iii})$$

It can be shown that if $H^{i-1}(f)$ satisfies equations (3), then the family of functions $H^i(f)$ produced by the operation of equations (4) also satisfy equations (3). Also, if two functions $H^{00}(f)$ and $H^{01}(f)$ both satisfy equations (3), then equations (3) are also satisfied by:

$$H^{10}(f) = H^{00}(\tfrac{1}{2} - (\tfrac{1}{2})|H^{01}(f)|^2 \quad (5.\text{i})$$

$$H^{01}(f) = H^{01}(\tfrac{1}{2} - (\tfrac{1}{2})|H^{00}(f)|^2) \quad (5.\text{ii})$$

If a suitable H(f) is selected, with $|H(f)|^2 > 1 - 2f$ for $f \in (0, \tfrac{1}{4})$ and $|H(f)|^2 < 1 - 2f$ for $f \in (\tfrac{1}{4}, \tfrac{1}{2})$, then iteration of the operation of equations (4) results in improved filter characteristics, with a narrowing of the transition band, and reduction of fluctuations in the pass and stopbands. Iteration also increases smoothness of $H^i(f)$.

It follows from the foregoing discussion that wavelets may be designed in the frequency domain according to the following procedure:

a) Define $H_0^0(f)$ in $f \in [-\tfrac{1}{4}, \tfrac{1}{4}]$ so that i) $|H_0^0(0)| = 1$; ii) $D|H_0^0(0)| = 0$ (D being the derivative); iii) $|H_0^0(\tfrac{1}{4})| = \sqrt{2}/2$; iv) $|H_0^0(f)|^2 > 1 - 2f$; v) $H_0^0(f) = [H_0^0(-f)]^*$ (with * denoting complex conjugation).

b) Define $H_1^0(f)$ in $f \in [\tfrac{1}{4}, \tfrac{1}{2}]$ so that $[H_1^0(f) = [1 - |H_0^0(f - \tfrac{1}{2})|^2]^{-\tfrac{1}{2}}$ c) Let $H^0(f) = \begin{cases} H_0^0(f) \text{ for } |f| \in \left[0, \tfrac{1}{4}\right] \\ H_1^0(f) \text{ for } |f| \in \left[\tfrac{1}{4}, \tfrac{1}{2}\right] \end{cases}$ and $|H^0(f)| = H^0(f+k)|$ for all integers k.

d) Iterate according to $H^1(f) = H^{i-1}(\tfrac{1}{2} - (\tfrac{1}{2})|H^{-1}(f)|^2)$.

e) $h^i(k)$ is obtained as the inverse fourier transform of $H^i(f)$.

f) The fourier transform of the scaling function $\phi$ is $$\hat{\phi} = \prod_{i=1}^{\infty} H(f/2^i)$$

The iterates can be truncated at the point beyond which the magnitude of the impulse response is less than a small amount such as $10^{-3}$.

Wavelet-based filters designed in the frequency domain according to the above procedure provide performance that compares favorably to that of cubic spline filters of higher order and also are an improvement over higher order filters described in "Orthonormal bases of compactly supported wavelets," I. Daubechies, Commun. on Pure and Applied Math, Vol. XLI, pp. 909–996, 1988.

In a preferred embodiment of the invention, $H^0(f)$ is selected to be $|\cos(\pi f)|$, and the following iterates are obtained:

$$H^1(f) = \left|\cos\left[\frac{\pi}{2}(1-\cos^2\pi f)\right]\right| = \left|\cos\left[\frac{\pi}{2}\sin^2 f\right]\right|$$

$$H^2(f) = \left|\cos\left[\frac{\pi}{2}\sin^2\left[\frac{\pi}{2}\sin^2\pi f\right]\right]\right|$$

$$H^3(f) = \left|\cos\left[\frac{\pi}{2}\sin^2\left[\frac{\pi}{2}\sin^2\left[\frac{\pi}{2}\sin^2\left[\frac{\pi}{2}\sin^2\pi f\right]\right]\right]\right]\right|$$

Figure 5:
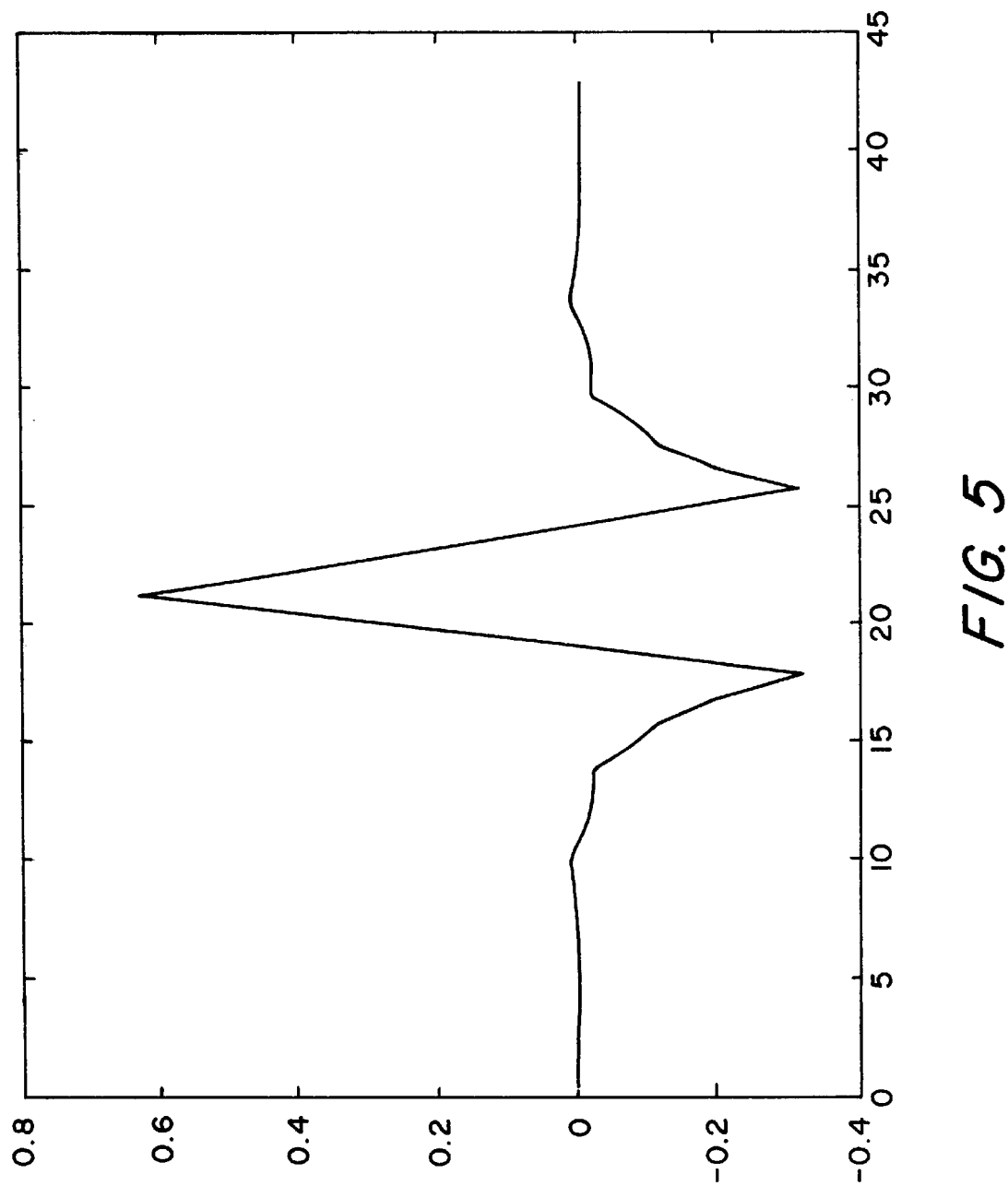
FIG. 5 is a graphical representation of a basis wavelet used in a wavelet transform carried out in the digital signal processing circuit.

The wavelet function obtained at scale 3 (shown in FIG. 5) was used as the analyzing wavelet for the filter bank of FIG. 3A. This wavelet function was found by visual inspection to closely resemble the waveform of the target signal. However, it is also contemplated to use standard methods to calculate the degree of similarity between a target signal and a prospective analyzing wavelet.

Figure 6:
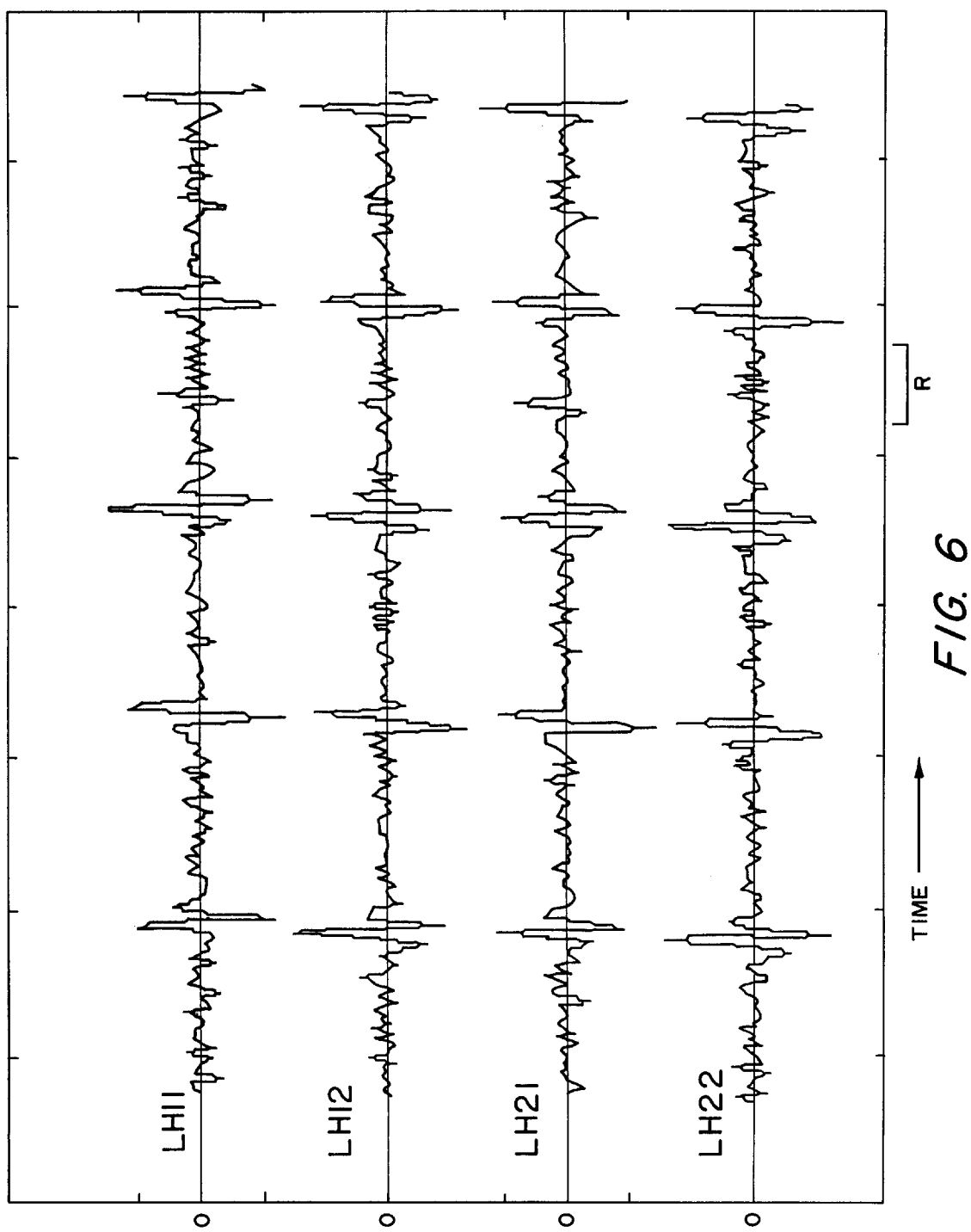
FIGS. 6–9 are waveform diagrams representing signals produced at certain stages of the signal processing algorithm of FIGS. 3A and 3B.

The four wavelet transform signals LH11, LH12, LH21 and LH22, having mutually different phases, are shown in FIG. 6. It will be noted that these four signals are highly correlated with each other except over a time period R. The subsequent processing of these four signals is designed to emphasize and detect the uncorrelated components of the four signals.

Figure 7:
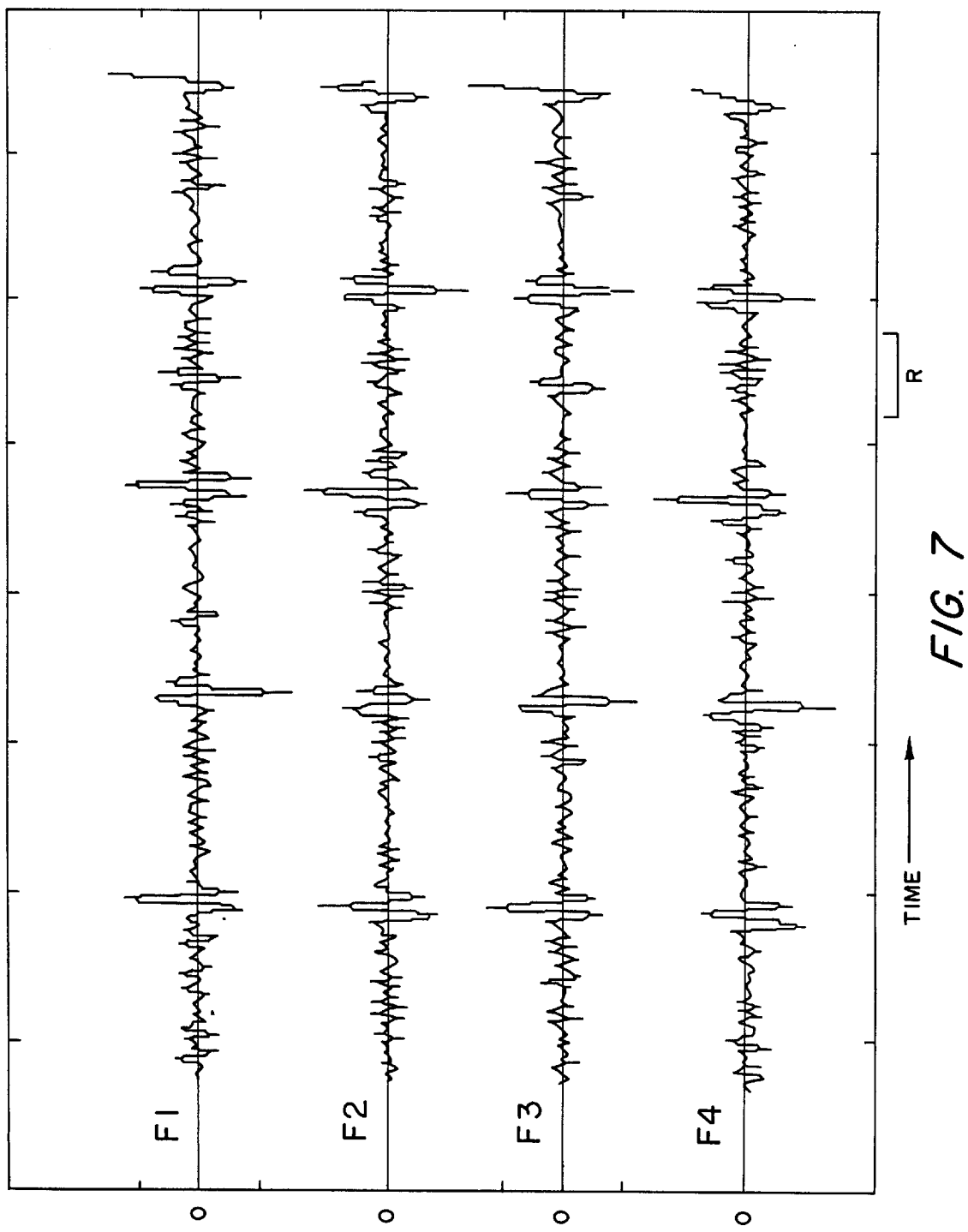

Accordingly, as shown in FIG. 3B, the four signals LH11, LH12, LH21 and LH22 are respectively filtered by identical filters 74, 76, 78 and 80 to produce filtered signals F1, F2, F3 and F4. The filters 74, 76, 78 and 80 are matched to the analyzing wavelet shown in FIG. 5, which was the wavelet used for the transform processing in blocks 50, 58 and 60 of FIG. 3A. The signals F1, F2, F3 and F4 respectively output from the filters 74, 76, 78 and 80 are shown in FIG. 7, from which it will be observed that the correlated components have been somewhat reduced in amplitude.

Figure 8:
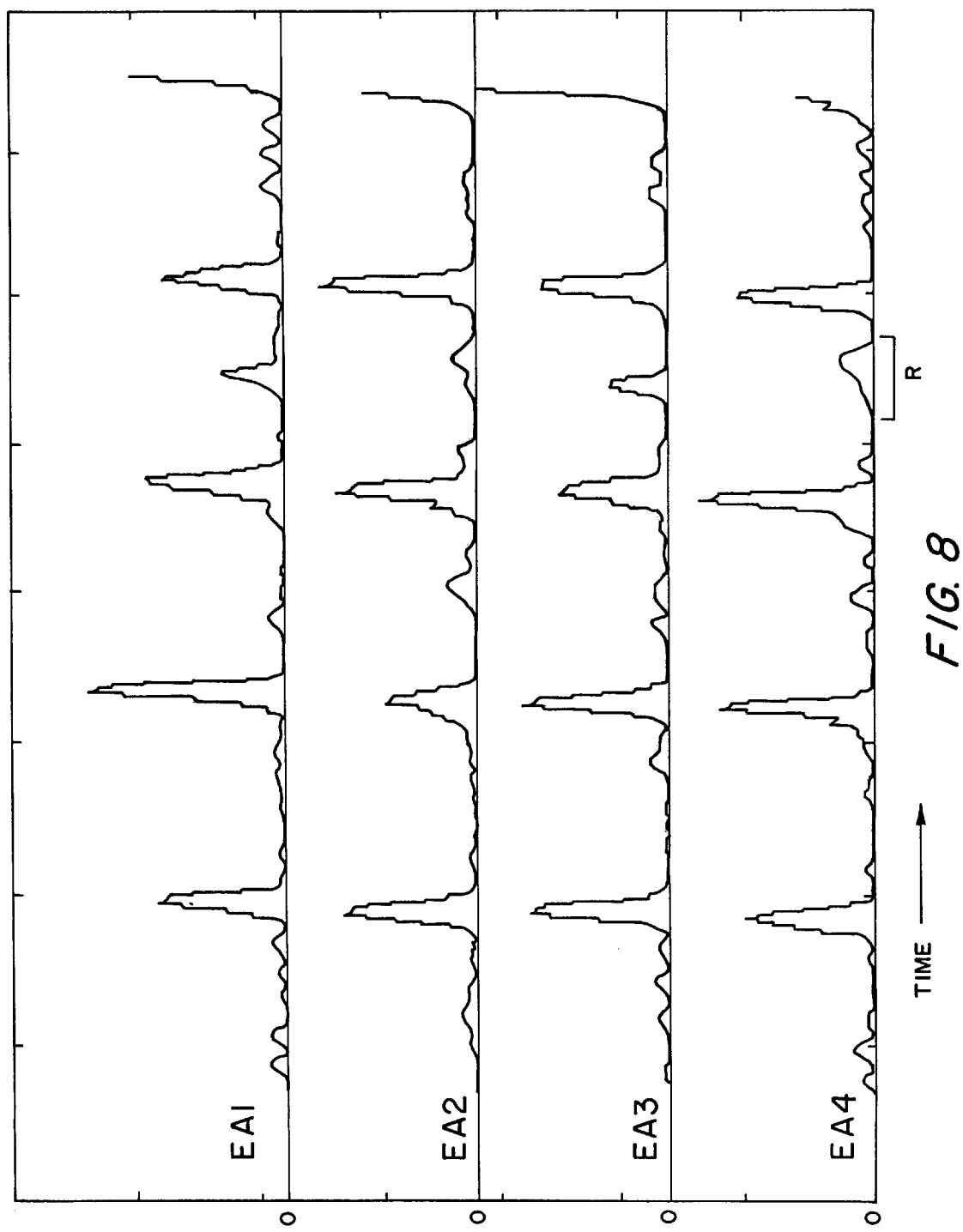

By respective energy accumulation blocks 82, 84, 86 and 88, an energy accumulation operation is performed on the signals F1, F2, F3 and F4 to yield signals EA1, EA2, EA3 and EA4. The energy accumulation may be calculated as, for example, a moving squared average of the respective signals F1, F2, F3 and F4. The resulting signals EA1 through EA4 are shown in FIG. 8. It will be noted that the effect of the energy accumulation is to substantially eliminate the smaller fluctuations in the signals F1 through F4. The signals EA1 through EA4 are then processed at respective threshold blocks 90, 92, 94 and 96 to produce respective output signals E1–E4. At each of the threshold blocks the signal inputted through the threshold block is compared with a threshold level, and signal samples falling below the threshold level are reduced to zero. The resulting signals E1 through E4 are then provided to a shift index discrimination block 98, which emphasizes the non-correlated components among the signals E1–E4.

In a general case, the shift index of a wavelet function can be defined as $$S_i = \frac{E_{max}}{E_a}, \text{ with}$$

$$E_{max} = \sup_{\Delta}\left\{\int_{-\infty}^{+\infty}|\hat{\psi}(f)|^2 \cdot \left|\sum \hat{x}(f+k) \cup (f+k)e^{-j2\pi fk\Delta}\right|^2 df\right\}$$

$$E_a = \int_{-\infty}^{+\infty}|\hat{x}(f)\hat{\psi}(f)|^2 df,$$

where $\Delta$ represents the degree of phase shift, $\hat{\psi}(f)$ is the fourier transform of the wavelet function $\psi(t)$, and $\hat{x}(f)$ is the fourier transform of the input signal $x(t)$.

In the particular case illustrated in FIGS. 3A and 3B, the shift index discriminator calculates the shift index at each sampling period as $$S_i = \frac{4 \cdot \max_i(Ei)}{\sum_i Ei}$$

Figure 9:
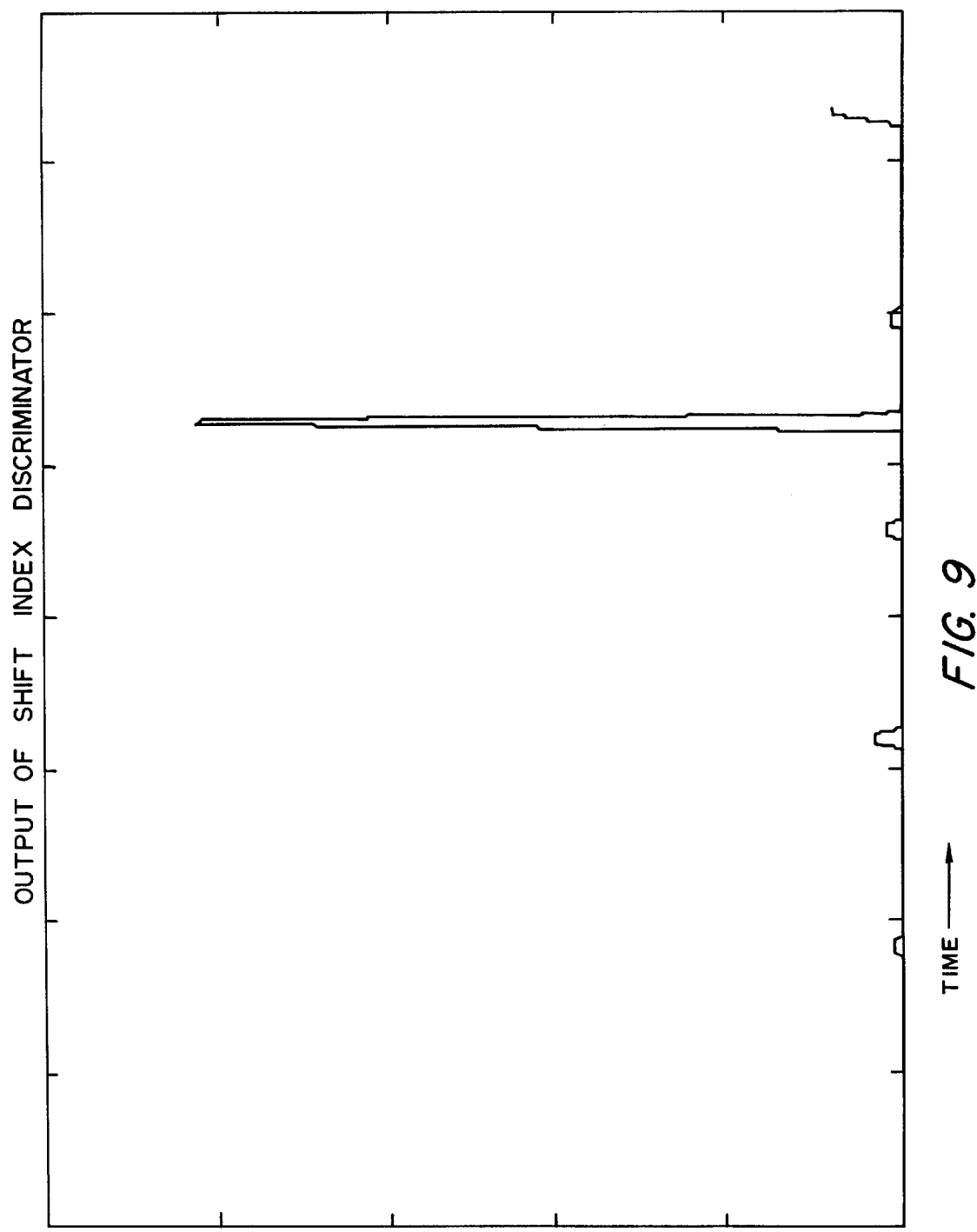

In other words, $S_i$ is calculated by dividing the largest of the signals E1 through E4 by the average of E1 through E4. The resulting shift index signal is output by the block 98 and is shown at FIG. 9. It will be noted that the uncorrelated components of the signals LH11 through LH22, after signal conditioning at blocks 74–96, have produced a sharp spike in the shift index signal output from the shift index discrimination block 98. This represents the target signal, for which the wavelet transform carried out in the processing of FIG. 3A substantially lacks phase invariance. As to the interference signals, the wavelet transform is substantially phase invariant so that the portions of the input signal consisting only of interference result in phase-diverse wavelet transform signals that are substantially correlated with each other. This is not the case, however, when the target signal is present, and the resulting lack of correlation among the phase-diverse wavelet transform signals can be detected to provide an indication of the presence of the target signal.

In particular, the shift index signal output by block 98 is provided to level detection block 100, at which the shift index signal is compared with a predetermined reference level to detect a spike that represents the presence of the target signal emitted by the EAS marker 18 within the noisy signal received at the antenna 22. The level detection block 100, in response to detection of the target signal spike, generates a signal to actuate operation of the indicator 34. As noted above, indicator 34 provides audible and/or visible indication that a marker 18 has been detected by the system 10.

As shown in FIG. 3A, in a preferred embodiment of the invention, the wavelet transform has been implemented with a filter bank having two stages and producing, with offset subsampling, four wavelet transform signals of diverse phases. However, it is contemplated to implement the wavelet transform using only a single stage filter bank, or using a filter bank that includes three or more stages. In each case, offset subsampling is to be performed, so that the number of phase-diverse wavelet transform signals to be generated is $2^n$ with n being the number of stages of the filter bank.

Further, although the above description of the invention was related to a harmonic signal EAS system, it is contemplated to use the invention in other types of EAS systems, such as magnetomechanical systems like the "ULTRA*MAX" system manufactured and sold by the assignee of this application.

Also, although it is believed that prospective wavelets to be matched with a target signal of interest can most efficiently be constructed in the frequency domain according to the procedure described above, it is also contemplated to construct appropriate wavelets by other known techniques.

Various changes to the foregoing apparatus and modifications in the described practices may be introduced without departing from the invention. The particularly preferred methods and apparatus are thus intended in an illustrative and not limiting sense. The true spirit and scope of the invention is set forth in the following claims.

What is claimed is:

1. A method of generating wavelet transform signals having mutually different phases, comprising the steps of:
    receiving an input digital signal having a sampling frequency fs;
    performing a wavelet transform with respect to the received input digital signal to obtain a wavelet transform signal in a signal band of said input signal;

subsampling said wavelet transform signal in said signal band by a factor of two to obtain a first phase wavelet transform signal having a first phase; and delaying said wavelet transform signal in said signal band by a sampling period corresponding to said sampling frequency fs and subsampling said delayed signal by a factor of two to obtain a second phase wavelet transform signal having a second phase that is different from said first phase.

2. A method according to claim 1, wherein said signal band is a low half-band of said input signal.

3. A method according to claim 1, wherein said input digital signal is a digitized article surveillance signal provided from a receiving circuit of an electronic article surveillance system.

4. A method according to claim 3, further comprising the step of:

processing said first and second phase wavelet transform signals to detect uncorrelated components thereof; and determining that a target signal generated by an electronic article surveillance marker is present in said input digital signal on the basis of said detected uncorrelated components of said first and second phase wavelet transform signals.

5. Apparatus for generating wavelet transform signals having mutually different phases, comprising:

means for receiving an input digital signal having a sampling frequency fs;

transform means for performing a wavelet transform with respect to the received input digital signal to obtain a wavelet transform signal in a signal band of said input signal;

means for subsampling said wavelet transform signal in said signal band by a factor of two to obtain a first phase wavelet transform signal having a first phase; and means for delaying said wavelet transform signal in said signal band by a sampling period corresponding to said sampling frequency fs and subsampling said delayed signal by a factor of two to obtain a second phase wavelet transform signal having a second phase that is different from said first phase.

6. Apparatus according to claim 5, wherein said signal band is a low half-band of said input signal.

7. Apparatus according to claim 5, further comprising:

a receiver circuit of an electronic article surveillance system, said receiver circuit for receiving an analog signal that includes a target signal indicative of an electronic article surveillance marker in proximity to said receiver circuit and interference signals that are correlated with said target signal; and conversion means for converting said analog signal received by said receiver circuit into said input digital signal and supplying said input digital signal to said means for receiving.

8. Apparatus according to claim 7, wherein said transform means performs said wavelet transform with a basis wavelet selected to match said target signal.

9. Apparatus according to claim 7, further comprising:

means for processing said first and second phase wavelet transform signals to detect uncorrelated components thereof; and means for determining that said target signal is present in said received analog signal on the basis of said detected uncorrelated components of said first and second phase wavelet transform signals.

10. A method of generating wavelet transform signals having mutually different phases, comprising the steps of:

receiving an input digital signal having a sampling frequency fs;

performing a first wavelet transform with respect to the received input digital signal to obtain a first intermediate wavelet transform signal in a signal band of said input signal;

subsampling said first intermediate wavelet transform signal in said signal band by a factor of two to obtain a second intermediate transform signal;

delaying said first intermediate wavelet transform signal in said signal band by a sampling period corresponding to said sampling frequency fs and subsampling said delayed signal by a factor of two to obtain a third intermediate wavelet transform signal, said second and third intermediate wavelet transform signals having mutually different phases;

performing a second wavelet transform with respect to said second intermediate transform signal to obtain a fourth intermediate wavelet transform signal in a subband of said signal band;

subsampling said fourth intermediate wavelet transform signal by a factor of two to obtain a first output wavelet transform signal having a first phase;

delaying said fourth intermediate wavelet transform signal by said sampling period and subsampling said delayed fourth intermediate wavelet transform signal by a factor of two to obtain a second output wavelet transform signal having a second phase that is different from said first phase;

performing said second wavelet transform with respect to said third intermediate wavelet transform signal to obtain a fifth intermediate wavelet transform signal in said subband of said signal band;

subsampling said fifth intermediate wavelet transform signal by a factor of two to obtain a third output wavelet transform signal having a third phase that is different from said first and second phases; and delaying said fifth intermediate wavelet transform signal by said sampling period and subsampling said delayed fifth intermediate wavelet transform signal by a factor of two to obtain a fourth output wavelet transform signal having a fourth phase that is different from said first, second and third phases.

11. A method according to claim 10, wherein said signal band is a low half-band of said input signal.

12. A method according to claim 11, wherein said subband is a high half-band of said signal band.

13. A method according to claim 10, wherein said input digital signal is a digitized article surveillance signal provided from a receiving circuit of an electronic article surveillance system.

14. A method according to claim 13, further comprising the steps of:

processing said first through fourth output wavelet transform signals to detect uncorrelated components thereof; and determining that a target signal generated by an electronic article surveillance marker is present in said input digital signal on the basis of said detected uncorrelated components of said first through fourth output wavelet transform signals.

15. A method of performing signal analysis on an input signal which includes a transient target signal that is predictable as to shape but not as to amplitude or time of occurrence and interfering signals correlated with the target signal, comprising the steps of:

performing a wavelet transform on said input signal so as to generate plural wavelet transform signals which have mutually different phases, said wavelet transform being substantially phase invariant with respect to the interfering signals and substantially lacking in phase invariance with respect to the target signal; and detecting the target signal by amplifying and detecting uncorrelated components of said plural wavelet transform signals.

16. A method according to claim 15, wherein said input signal is a signal received by a receiving circuit of an electronic article surveillance system, and said target signal is generated by an electronic article surveillance marker in response to an interrogation field generated by said electronic article surveillance system.

17. Apparatus for performing signal analysis on an input signal which includes a transient target signal that is predictable as to shape but not as to amplitude or time of occurrence and interfering signals correlated with the target signal, comprising:

wavelet transform means for performing a wavelet transform on said input signal so as to generate plural wavelet transform signals which have mutually different phases, said wavelet transform being substantially phase invariant with respect to the interfering signals and substantially lacking in phase invariance with respect to the target signal, and detection means for detecting the target signal by amplifying and detecting uncorrelated components of said plural wavelet transform signals.

18. Apparatus according to claim 17, wherein said wavelet transform means and said detection means comprise an integrated circuit digital signal processing device operating under control of a stored program.

19. Apparatus according to claim 18, further comprising:

a receiver circuit of an electronic article surveillance system for receiving an analog signal, said target signal being a component of said analog signal and being indicative of an electronic article surveillance marker in proximity to said receiver circuit; and conversion means for converting said analog signal received by said receiver circuit into a digital signal and for supplying said digital signal to said integrated circuit digital signal processing device as said input signal.

20. Apparatus according to claim 17, wherein said electronic article surveillance system generates an interrogation field signal that alternates at a predetermined frequency and said target signal comprises a pulse having harmonics of said predetermined frequency, said pulse being generated by said marker in response to said field signal.

21. An electronic article surveillance system comprising:

means for generating and radiating an interrogation signal;

means for receiving an analog signal that includes a target signal formed by an electronic article surveillance marker upon exposure to the radiated interrogation signal and interference signals correlated with the target signal;

analog filter means for filtering the received analog signal;

conversion means for converting the filtered analog signal into a digital signal; and an integrated circuit signal processing device for receiving said digital signal, said integrated circuit signal processing device being programmed to perform a wavelet transform on the received digital signal.

22. An electronic article surveillance system according to claim 21, wherein said digital signal has a sampling frequency fs and said integrated circuit signal processing device is programmed to:

perform said wavelet transform so as to obtain a first intermediate wavelet transform signal in a signal band of said received digital signal;

subsample said first intermediate wavelet transform signal in said signal band by a factor of two to obtain a second intermediate transform signal;

delay said first intermediate wavelet transform signal in said signal band by a sampling period corresponding to said sampling frequency fs;

subsample said delayed first intermediate wavelet signal by a factor of two to obtain a third intermediate wavelet transform signal;

perform a second wavelet transform with respect to said second intermediate transform signal to obtain a fourth intermediate transform signal in a subband of said signal band;

subsample said fourth intermediate wavelet transform signal by a factor of two to obtain a first final wavelet transform signal having a first phase;

delay said fourth intermediate wavelet transform signal by said sampling period;

subsample said delayed fourth intermediate wavelet transform signal by a factor of two to obtain a second final wavelet transform signal having a second phase that is different from said first phase;

perform said second wavelet transform with respect to said third intermediate wavelet transform signal to obtain a fifth intermediate wavelet transform signal in said subband of said signal band;

subsample said fifth intermediate wavelet transform signal by a factor of two to obtain a third final wavelet transform signal having a third phase that is different from said first and second phases;

delay said fifth intermediate wavelet transform signal by said sampling period; and subsample said delayed fifth intermediate wavelet transform signal by a factor of two to obtain a fourth final wavelet transform signal having a fourth phase that is different from said first, second and third phases.

23. An electronic article surveillance system according to claim 22, wherein said integrated circuit signal processing device is programmed to:

perform respective digital filtering of the first through fourth final wavelet transform signals;

perform a respective energy accumulation with respect to each of the digitally filtered first through fourth final wavelet transform signals to form first through fourth energy accumulation signals;

apply a threshold function respectively to each of the first through fourth energy accumulation signals to produce first through fourth comparison signals;

quantify a degree of uncorrelation among the first through fourth comparison signals to generate a discrimination signal; and compare said discrimination signal to a predetermined detection level;

and further comprising indication means responsive to said integrated signal processing device for indicating detection of said electronic article surveillance marker when said discrimination signal exceeds said predetermined detection level.

24. An electronic article surveillance system according to claim 23, wherein said wavelet transforms are performed with basis wavelet selected to match the target signal and said digital filtering of said first through fourth final wavelet transform signals is performed with a filtering algorithm matched to the basis wavelet.

25. An electronic article surveillance system according to claim 23, wherein said energy accumulations are performed by calculating a respective moving squared average of each of the filtered first through fourth final wavelet transform signals.

26. An electronic article surveillance system according to claim 23, wherein said threshold function is performed by reducing to zero each sample of said energy accumulation signals that is less than a predetermined threshold level.

27. An electronic article surveillance system according to claim 22, wherein said first intermediate wavelet transform signal is obtained in a low half-band of said received digital signal.

28. An electronic article surveillance system according to claim 27, wherein said fourth and fifth intermediate wavelet transform signals are obtained in an upper half of said low half-band.

29. An electronic article surveillance system according to claim 21, wherein said integrated circuit signal processing device is programmed to perform said wavelet transform on said received digital signal so as to generate plural wavelet transform signals which have mutually different phases, said wavelet transform being substantially phase invariant with respect to the interference signals and substantially lacking in phase invariance with respect to the target signal, said integrated circuit signal processing device being further programmed to detect the target signal by amplifying and detecting unrelated components of said plural wavelet transform signals.

30. An electronic article surveillance system according to claim 29, wherein said wavelet transform is performed with a basis wavelet selected to match said target signal.

31. An electronic article surveillance system according to claim 21, wherein said interrogation signal alternates at a predetermined frequency and said target signal formed by said electronic article surveillance marker comprises a pulse having harmonics of said predetermined frequency.

32. An electronic article surveillance system comprising:
  means for generating and radiating an interrogation signal;
  means for receiving an analog signal that includes a target signal formed by an electronic article surveillance marker upon exposure to the radiated interrogation signal and interference signals correlated with the target signal;
  analog filter means for filtering the received analog signal;
  conversion means for converting the filtered analog signal into a digital signal; and
  wavelet transform means for performing a wavelet transform on the digital signal.

33. An electronic article surveillance system according to claim 32, wherein said wavelet transform means performs said wavelet transform using a basis wavelet that has been selected to match the target signal.

34. An electronic article surveillance system according to claim 33, wherein said wavelet transform means includes means for generating from said digital signal plural wavelet transform signals which have mutually different phases.

35. An electronic article surveillance system according to claim 34, further comprising detection means for amplifying and detecting uncorrelated components of said plural wavelet transform signals.

36. An electronic article surveillance system according to claim 32, further comprising indication means responsive to said detection means for indicating detection of the target signal.

37. An electronic article surveillance system according to claim 32, wherein said interrogation signal alternates at a predetermined frequency and said target signal formed by said electronic article surveillance marker comprises a pulse having harmonics of said predetermined frequency.

38. A method of performing electronic article surveillance, comprising the steps of:
  generating and radiating an interrogation signal;
  receiving an analog signal that includes a target signal formed by an electronic article surveillance marker upon exposure to the radiated interrogation signal and interference signals correlated with the target signal;
  filtering the received analog signal;
  converting the filtered analog signal into a digital signal; and
  performing a wavelet transform on the received digital signal.

39. A method according to claim 38, wherein said wavelet transform is performed with a basis wavelet that has been selected to match the target signal.

40. A method according to claim 38, wherein said step of performing said wavelet transform includes generating from said digital signal plural wavelet transform signals which have mutually different phases.

41. A method according to claim 40, further comprising the step of amplifying and detecting uncorrelated components of said plural wavelet transform signals.

* * * * *

UNITED STATES PATENT AND TRADEMARK OFFICE
CERTIFICATE OF CORRECTION

PATENT NO. : 6,310,963 B1
DATED : October 30, 2001
INVENTOR(S) : Nurgun Erdol et al.

It is certified that error appears in the above-identified patent and that said Letters Patent is hereby corrected as shown below:

Column 1,
Line 37, delete "wavelet,transform" and insert -- wavelet transform --.
Line 46, delete "a" and insert -- a --.
Line 49, delete "a" and insert -- a --.

Column 15,
Line 8, delete "with basis" and insert -- with a basis --.

Signed and Sealed this

Nineteenth Day of November, 2002

Attest:

JAMES E. ROGAN
Attesting Officer   Director of the United States Patent and Trademark Office